March 4, 1958
B. WASKO
2,825,231
BEAD CHAIN DRIVE SYSTEM
Filed April 20, 1956
2 Sheets-Sheet 1
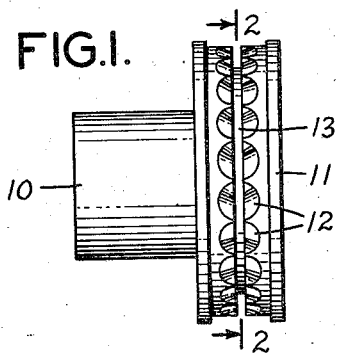
FIG.1.
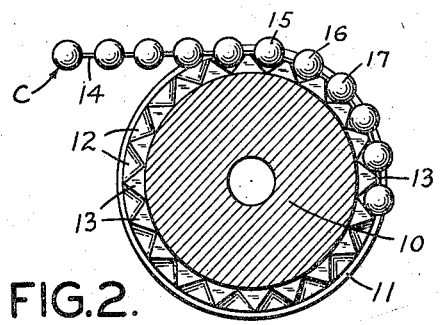
FIG.2.
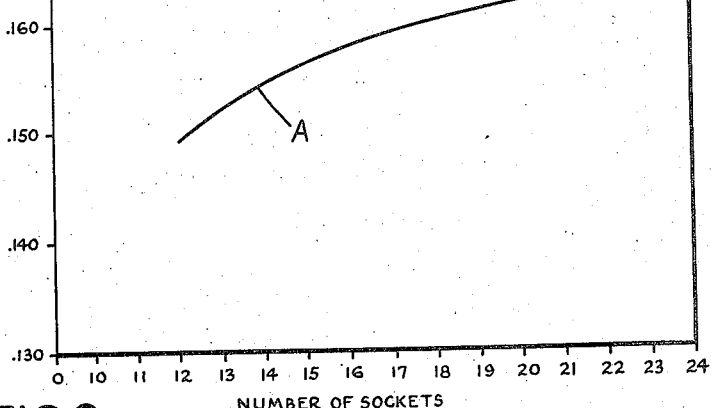
FIG.6. NO. 6 BEAD CHAIN 72 BEADS PER FOOT
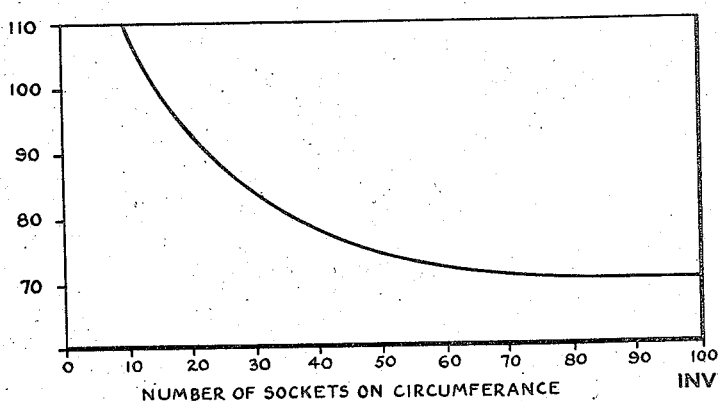
FIG.7. CONE ANGLES FOR NO.6 QUALIFIED BEAD CHAIN
INVENTOR
BERNARD WASKO
BY
HIS ATTORNEYS March 4, 1958 — B. WASKO — 2,825,231

BEAD CHAIN DRIVE SYSTEM

Filed April 20, 1956 — 2 Sheets-Sheet 2

INVENTOR
BERNARD WASKO
BY
HIS ATTORNEYS

United States Patent Office 2,825,231
Patented Mar. 4, 1958

2,825,231

BEAD CHAIN DRIVE SYSTEM

Bernard Wasko, Eastchester, N. Y., assignor to Voland and Sons, Inc., New Rochelle, N. Y., a corporation of New York Application April 20, 1956, Serial No. 579,564

1 Claim. (Cl. 74—243)

This invention relates to improvements in power transmitting mechanisms and it relates particularly to an improved form of bead chain drive and sprocket for such a bead chain drive whereby a precise and accurate transmission of motion and a smooth flow of power can be accomplished through the medium of such a bead chain drive.

Heretofore, bead chains and their sprockets have been used for light duty transmission of power and in mechanisms wherein the motion of one pulley element need not be precisely followed by another pulley driven by means of the interposed bead chain. Moreover, such bead chain drives have been satisfactory only when used at relatively low speeds because they have a tendency to vibrate and to operate roughly. The difficulty with such prior bead chain mechanisms resides in the fact that the sprockets used heretofore have almost universally been provided with hemispherical sockets for receiving the beads of the chain to provide a positive driving relation between them. Inasmuch as the hemispherical sockets are designed to fit the beads rather snugly and the difference between the pitch of the beads in the straight part of the path of the chain and the pitch of the beads when passing around the sprocket is substantial, interference occurs between the beads of the chain and the sprocket at the time that the beads are just coming into contact with the sprocket and attempting to enter the sockets. As a result, the beads have a tendency to ride on the periphery of the sprocket for a short distance before they slide into the hemispherical sockets and this lack of meshing between the beads and the sprockets sets up a vibration and a jerky or intermittent operation.

In accordance with the present invention, I have provided a sprocket construction in which the pitch of the sockets and their formation is such as to enable the beads of a bead chain to enter smoothly into the sockets and to follow around the periphery of the sprocket without changing the relation of the beads and thereby enabling a precise transmission of power and achieving smooth operation of the bead chain even at high speeds.

More particularly, I have provided conical sockets in the periphery of the sprocket having a proper pitch relation to the pitch of the beads of the chain and having such cone angles and shapes that the beads can enter into the sockets smoothly without any hesitation or roughness thereby eliminating vibration and jerking of the chain and sprocket during operation.

For a better understanding of the present invention, reference may be had to the accompanying drawings in which:

Figure 1 is a front elevational view of a typical bead chain sprocket in accordance with the present invention;

Figure 2 is a view in section taken on line 2—2 of Figure 1 also showing a portion of a bead chain;

Figure 6 is a graph illustrating the relationship of the pitch distance of the sockets to the number of sockets in a sprocket in order to accomplish the results of the present invention; and Figure 7 is a chart illustrating the relationship between the socket cone angle and the number of sockets on a sprocket.

Figure 3:
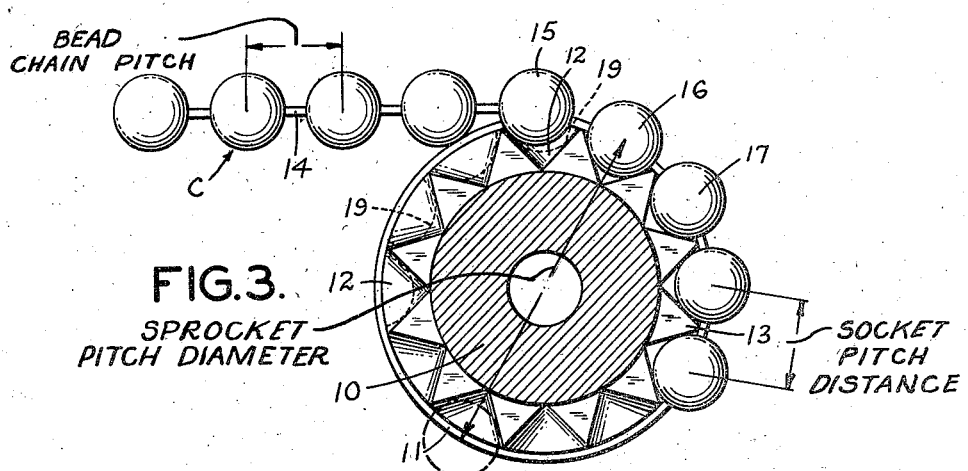
Figures 3, 4 and 5 are schematic illustrations illustrating the cooperation between the beads of a bead chain and the sprocket during the entry of a bead into a socket.

A typical sprocket for a bead chain mechanism is illustrated in Figures 1 and 2 of the drawing. The sprocket may be of generally conventional outward configuration including a hub 10 provided with a rim 11 having a series of conical sockets 12 in it. A circumferential slot 13 extends around the center line of the rim 11 to about the inner ends of the sockets 12 as best shown in Figure 2 in order to receive the connecting links or wires 14 between the beads 15, 16, etc. of a bead chain.

Figure 4:
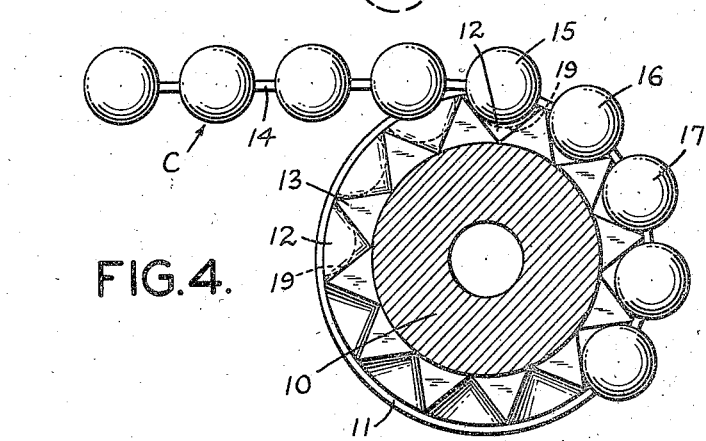
Figure 5:
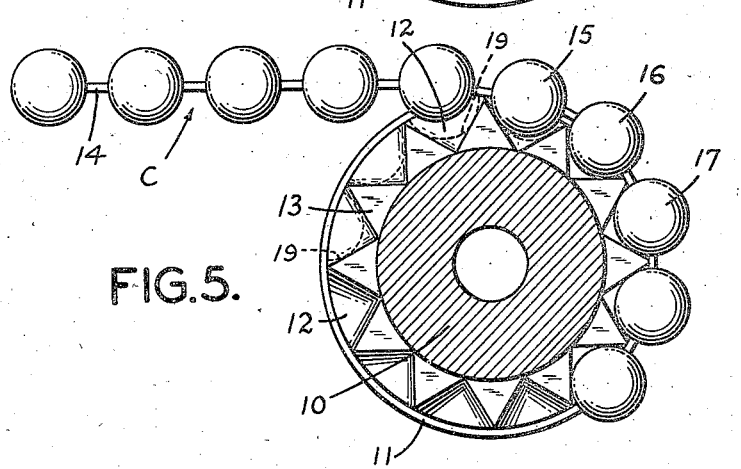

In accordance with the present invention, the pitch and configuration of the conical sockets 12 are designed to cooperate with the bead chain in a manner best suited for efficient and smooth transmission of power. The relationship between the beads and the sockets will best be understood by reference to Figures 3, 4 and 5 of the drawing.

As shown in Figure 3, a section of a bead chain C including the connecting links 14 and a series of beads 15, 16, 17 etc. is illustrated in the position assumed in relation to the sprocket 10 during movement of the chain and sprocket. Also shown on the drawings for purposes of comparison are arcuate or hemispherical socket portions 19 to indicate the difference in the action of the beads with respect to the conical sockets and the hemispherical sockets. Considering the relationship of the bead 15 to the socket 12 as shown in Figure 3 and a hemispherical socket 19, it will be apparent that while the bead 15 is entering smoothly into the conical socket 12, the bead could not enter the hemispherical socket 19 at all but would rest on the rim of the sprocket. In the position of the bead 15 and the socket 12 shown in Figure 4, it will be apparent that the bead has moved down the side of the socket 12 smoothly and without any outward displacement. It will be apparent that the edge of hemispherical socket 19 would still interfere with entry of the bead 15 into the socket. In a further angularly rotated position shown in Figure 5, the bead 15 has now moved almost into complete engagement with the both walls of the conical socket 12 at about its mid-point whereas the bead still cannot enter fully into the hemispherical socket 19. Because of the smooth entry of the beads into the conical sockets in accordance with the present invention, the new construction overcomes the roughness and inaccuracy of the prior bead chain drives.

The mere substitution of conical sockets for the hemispherical sockets heretofore used is not sufficient to overcome the disadvantages of the prior sprockets. The pitch diameter of the sprocket is very important in determining the roughness of operation of the bead chain transmission. Pitch diameter, as used herein, is the distance across the diameter of the sprocket measured to the centers of diametrically spaced balls fully seated in the sockets of the sprockets, as shown in Figure 3. Sprockets smaller than one and one-quarter inches in diameter when used with beads on the order of one-eighth inch in diameter, for example, are normally very rough in operation while sprockets larger than about one and a quarter inches in diameter cause little difficulty in operation. I have discovered that an important relationship exists between the number of sockets and their sizes and cone angles and the diameter of the sprocket and the pitch of the bead chain in controlling the smoothness and accuracy of operation of a bead chain drive. The pitch of the beads of the chains is the distance between the centers of adjacent beads in a straight portion of the chain, as shown in Figure 3. Smaller diameter sprockets, that is, sprockets less than one and a quarter inches in pitch diameter, must be accurately designed with respect to pitch distance between sockets and the proper cone angle if smooth operation is to be achieved. Referring now to Figure 6 of the drawings, a curve A is shown which delineates the relation between socket pitch distance and the number of sockets in a sprocket having a pitch diameter of 1.147 inches for a conventional No. 6 bead chain which has 72 beads per foot, i. e., a pitch of 0.166 inch, each bead being .125 inch in diameter. Suitable sprockets having a pitch diameter for proper cooperation with a bead chain of the type described are shown in the following table.

TABLE A

| Number of Sockets | Pitch Diameter | Number of Sockets | Pitch Diameter |
| --- | --- | --- | --- |
| 12 | .562 | 36 | 1.886 |
| 16 | .800 | 40 | 2.078 |
| 20 | 1.041 | 48 | 2.515 |
| 24 | 1.147 | 60 | 3.150 |
| 30 | 1.569 | 72 | 3.780 |
| 32 | 1.670 | | |

A sprocket having twenty four sockets and having a pitch diameter of about 1.147 inches, should have a socket pitch distance, i. e., the distance between the centers of two beads fully seated in two adjacent sockets, of approximately .165 inch or about 99% of the pitch distance between the centers of the beads of the chain, this distance being .166 inch. Above this point on the curve, it becomes almost unity with respect to the maximum pitch distance thereby showing that in the larger diameter sprockets, that is, in sprockets in excess of about one and a quarter inches in pitch diameter when used with No. 6 chain, the pitch between the sockets becomes so close to the pitch of the beads that a smooth operation is assured as long as the sockets are made large enough to avoid interference between the edges of the sockets and the beads.

Figure 7 shows that the socket cone angle preferably should be subsantially larger in a small diameter sprocket and with a fewer number of sockets than is required in the larger sizes of sprockets having a greater number of bead-receiving sockets therein. Thus, the cone angle of the sockets in a sprocket having ten sockets therein of proper size for reception of the beads of a No. 6 chain, should be about 110°. With a socket having between twenty and thirty sockets for reception of the beads of a No. 6 chain, the socket cone angle should be approximately 82°. The cone angle diminishes for larger diameter sprockets with larger numbers of sockets therein indicating that the width or cone angle of the sockets is less critical in the larger diameter sprockets.

The difference between the pitch of the beads and the pitch of the sockets is due to the fact that the chain is bent in passing around the sprocket. Despite the fact that the beads are spherical, their surfaces at the inner side of the bend approach each other with the result that the pitch of the sockets must be less in a small diameter sprocket to match the closer spacing or pitch of the beads. Accordingly, the relation of the sockets to the beads must be such that when the beads are seated around 180° of a sprocket, the pitch of the sockets is equal to the pitch of the beads in the curved chain. On the other hand, the pitch of the beads increases as the chain straightens while the pitch of the socket can not change and it is this difference in pitch which causes the interference common to prior types of bead chain drives that cause rough and inaccurate operation thereof. By providing the sprockets with sockets having the proper cone angle and utilizing sockets in the proper pitch relation as indicated above, the beads enter into the sockets smoothly, seat at about the mid-points of the sockets while traversing around the 180° or curved part of the path of the chain and disengage freely without binding so that a tight chain with correspondingly improved accuracy of operation is readily obtainable with the new sprockets and chains.

It will be understood that the number of sockets in the sprocket can be changed depending upon the size of chain used and that with smaller and more closely spaced beads or beads of smaller pitch, the spacing and size of the sockets in the sprockets will also be altered within the ranges referred to above. Accordingly, the example given herein should be considered as illustrative and not as limiting the scope of the following claim.

I claim:

A power transmitting mechanism comprising a chain including a plurality of spherical beads connected by wire links and having a predetermined pitch and at least one sprocket over which the chain passes, said sprocket having a plurality of bead-receiving sockets contiguously positioned uniformly around its periphery, said sockets being substantially conical in shape and having a diameter at the periphery of said sprocket greater than the diameter of each bead so that the beads engage the sockets about midway of the depth of the sockets when fully seated therein and the pitch distance of said sockets being in a range between about 85% and 99% of the pitch of said beads, the ratio of the pitch distance of said sockets in a sprocket of a given pitch diameter to the pitch of said beads increasing within said range as the number of sockets in said sprocket is increased, the cone angle of said sockets being between about 110° and 82°, and the pitch diameter of said sprocket being of an amount not to exceed about ten times the diameter of said beads.

References Cited in the file of this patent

FOREIGN PATENTS

| 4,496 | Great Britain | of 1891 |
| 19,607 | Great Britain | of 1897 |